United States Patent
Madhavapeddi et al.

(10) Patent No.: US 9,304,841 B2
(45) Date of Patent: *Apr. 5, 2016

(54) DISPATCHER FRAMEWORK TO PROVIDE INTER-APPLICATION COMMUNICATION

(71) Applicant: EMC Corporation, Hopkinton, MA (US)

(72) Inventors: Vijay C. Madhavapeddi, Cupertino, CA (US); Kiran K. Bachu, Cupertino, CA (US)

(73) Assignee: EMC Corporation, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/697,116

(22) Filed: Apr. 27, 2015

(65) Prior Publication Data

US 2015/0227402 A1    Aug. 13, 2015

Related U.S. Application Data

(63) Continuation of application No. 13/923,234, filed on Jun. 20, 2013, now Pat. No. 9,043,814.

(51) Int. Cl.
*G06F 9/54* (2006.01)
*G06F 9/455* (2006.01)

(52) U.S. Cl.
CPC ............ *G06F 9/547* (2013.01); *G06F 9/45533* (2013.01); *G06F 9/541* (2013.01)

(58) Field of Classification Search
None
See application file for complete search history.

(56) References Cited

U.S. PATENT DOCUMENTS

| | | | | |
|---|---|---|---|---|
| 8,327,390 | B2 * | 12/2012 | Erlingsson | G06F 9/4411 719/328 |
| 2004/0226030 | A1 * | 11/2004 | Marvin | G06F 8/41 719/328 |
| 2012/0079036 | A1 * | 3/2012 | Andersen | H04L 12/585 709/206 |

* cited by examiner

*Primary Examiner* — Andy Ho
*Assistant Examiner* — Abdou Seye
(74) *Attorney, Agent, or Firm* — Van Pelt, Yi & James LLP (57) ABSTRACT

A dispatcher framework to provide non-blocking inter-application communication is disclosed. In various embodiments, a call to a service that is blocking with respect to the service is received from a calling process. The service is called on behalf of the calling process in a manner that does not require the calling process to remain blocked during at least a portion of a time during which the call to the service is performed.

26 Claims, 10 Drawing Sheets

DISPATCHER FRAMEWORK TO PROVIDE INTER-APPLICATION COMMUNICATION

CROSS REFERENCE TO OTHER APPLICATIONS

This application is a continuation of U.S. patent application Ser. No. 13/923,234, now U.S. Pat. No. 9,043,814 entitled DISPATCHER FRAMEWORK TO PROVIDE INTER-APPLICATION COMMUNICATION filed Jun. 20, 2013 which is incorporated herein by reference for all purposes.

This application is a continuation of co-pending U.S. patent application Ser. No. 13/923,234, entitled DISPATCHER FRAMEWORK TO PROVIDE INTER-APPLICATION COMMUNICATION filed Jun. 20, 2013 which is incorporated herein by reference for all purposes.

BACKGROUND OF THE INVENTION

Applications, systems, and other resources may expose functionality as a service, such as a web service, that can be invoked by another application, system, etc., for example by making a function or other call in to the service. Typically, an API, web services definition, etc. is provided to define and describe the manner in which such service calls are required to be made.

Typically, the called service requires a finite amount of time to perform and complete processing required by the call, and to form and return a response. The calling application, process, etc. may be blocked from performing other tasks until a response to a service call is received. If the latency is relatively high, the efficiency and throughput of the calling application may be impacted adversely, particularly if the calling application has a single thread architecture.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A dispatcher framework to provide non-blocking access to a called service is disclosed. In various embodiments, a dispatcher is provided to receive from a calling process and fulfill in a manner that does not block the calling process a service request to a service that is blocking with respect to the service. In some embodiments, the dispatcher spawns and acts a proxy for the calling process to a service connector configured to call the destination service on behalf of the calling process, and to receive and return to the calling process a result of the service request. In various embodiments, the calling process may poll the dispatcher periodically until a response is determined to be available and/or may provide to the dispatcher a return function of the calling process, to be called by the dispatcher to return the result of the service request.

Figure 1:
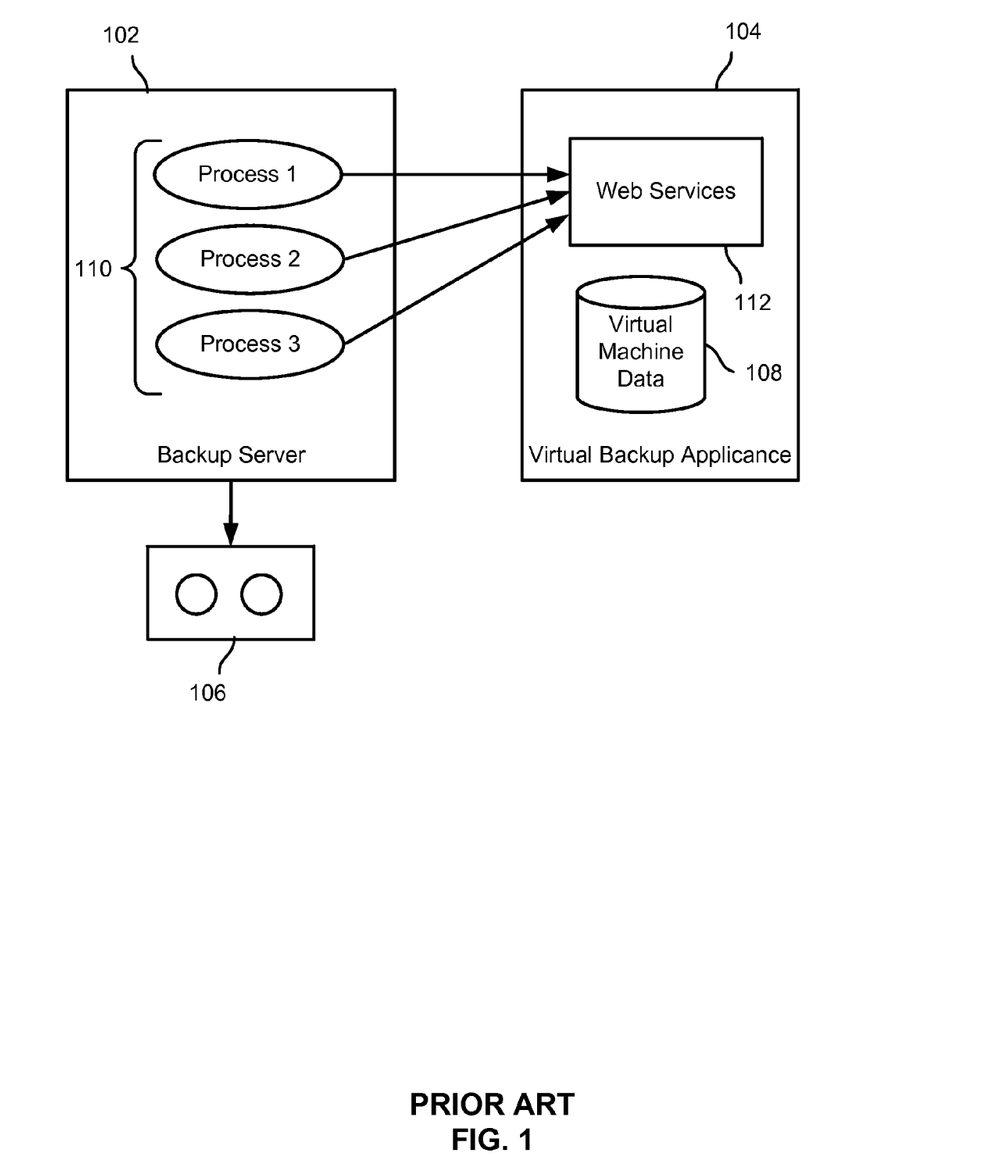
FIG. 1 is a block diagram illustrating an embodiment of a prior art system configured to interact with a service-oriented architecture.

FIG. 1 is a block diagram illustrating an embodiment of a prior art system configured to interact with a service-oriented architecture. In the example shown, a backup server 102 is configured to backup periodically virtual machine (VM) and/or other data stored on a virtual backup appliance 104. In some embodiments, virtual backup appliance 104 includes a virtualized instance of EMC® Avamar® configured to backup one or more virtual machines. In some embodiments, the backup server 102 includes an EMC® NetWorker® or other backup server configured to backup to tape or other storage media 106 virtual machine data stored in a virtual machine data store 108 of virtual backup appliance 104. In the example shown, to access and backup data stored in virtual machine data store 108, a set of processes 110 each interacts in the example shown with a web services interface 112 of the virtual backup appliance 104.

The prior art illustrated by the example shown in FIG. 1 may suffer from one or more disadvantages. For example, one or more of the server processes 110 may be blocked for an unacceptably long period of time due to the request-response time associated with calling the external service 112. Such blocking may affect performance and scalability. When communicating with other entities, the threads or processes may be forced to block execution because the API they called might only support blocking function calls (synchronous function calls). A single threaded server process may not be able to afford to block because it cannot process any other requests and might cause the system to fail. In some cases, a server process may be overloaded with managing interactions with application-specific third party tools and as a result may be dependent on such third party tools and/or prone to server crashes when the third party tools crash. Finally, multiple processes in a system may need to integrate with application specific third party tools. Parallel runs of these processes can destabilize the calling system and may overload the target system.

Figure 2A:
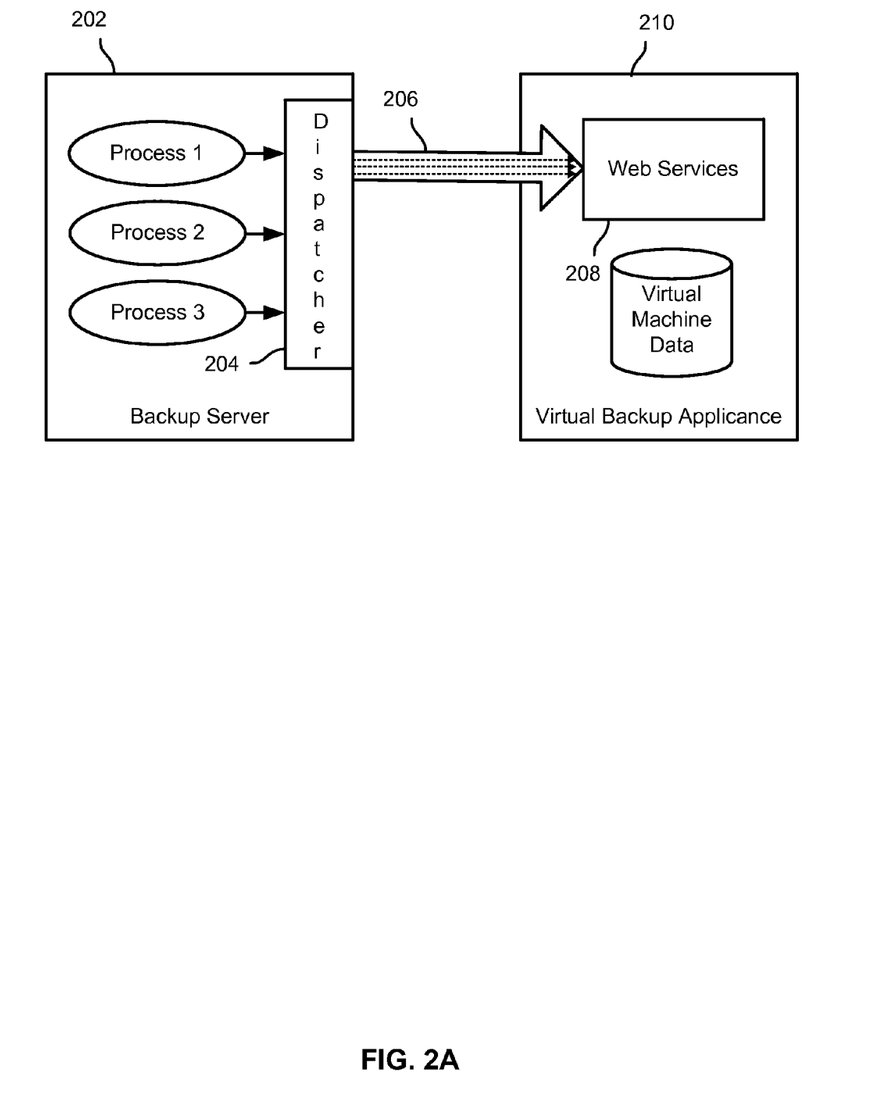
FIG. 2A is a block diagram illustrating an embodiment of a system comprising a dispatcher to manage calls to other applications and services.

FIG. 2A is a block diagram illustrating an embodiment of a system comprising a dispatcher to manage calls to other applications and services. In the example shown, the server 202 includes a plurality of processes each configured to interact with an external service via a dispatcher 204. In various embodiments, the dispatcher 204 provides to processes running on server 202 a single point of access to one or more external services. In the example shown, each of the processes of server 202 interacts with the dispatcher 204 to make service requests. The dispatcher 204 manages a set of connection 206 to a web services or other service-oriented interface 208 of a remote system, in this example a virtual backup appliance 210. The processes of server 202 send service requests to dispatcher 204. In some embodiments, dispatcher 204 establishes a separate connection to the external service for each process on server 202 that may desire to access the service. The dispatcher 204 acts as a proxy for each calling-process-specific connection to the service, enabling the calling processes to direct service requests to the dispatcher 204. In some embodiments, the calling process may provide a function to be called by the dispatcher 204 when a result of the service request from the calling process is received by the dispatcher 204 and/or an associated entity. For example, the calling process may send a service request to the dispatcher and then move on to do other work while the dispatcher 204 requests the service and waits for the result. In some embodiments, the calling process may not have or provide a return function to be called to return a result of a service request sent to dispatcher 204 and instead the calling process polls the dispatcher, e.g., periodically, until a result and/or status data are available.

Figure 2B:
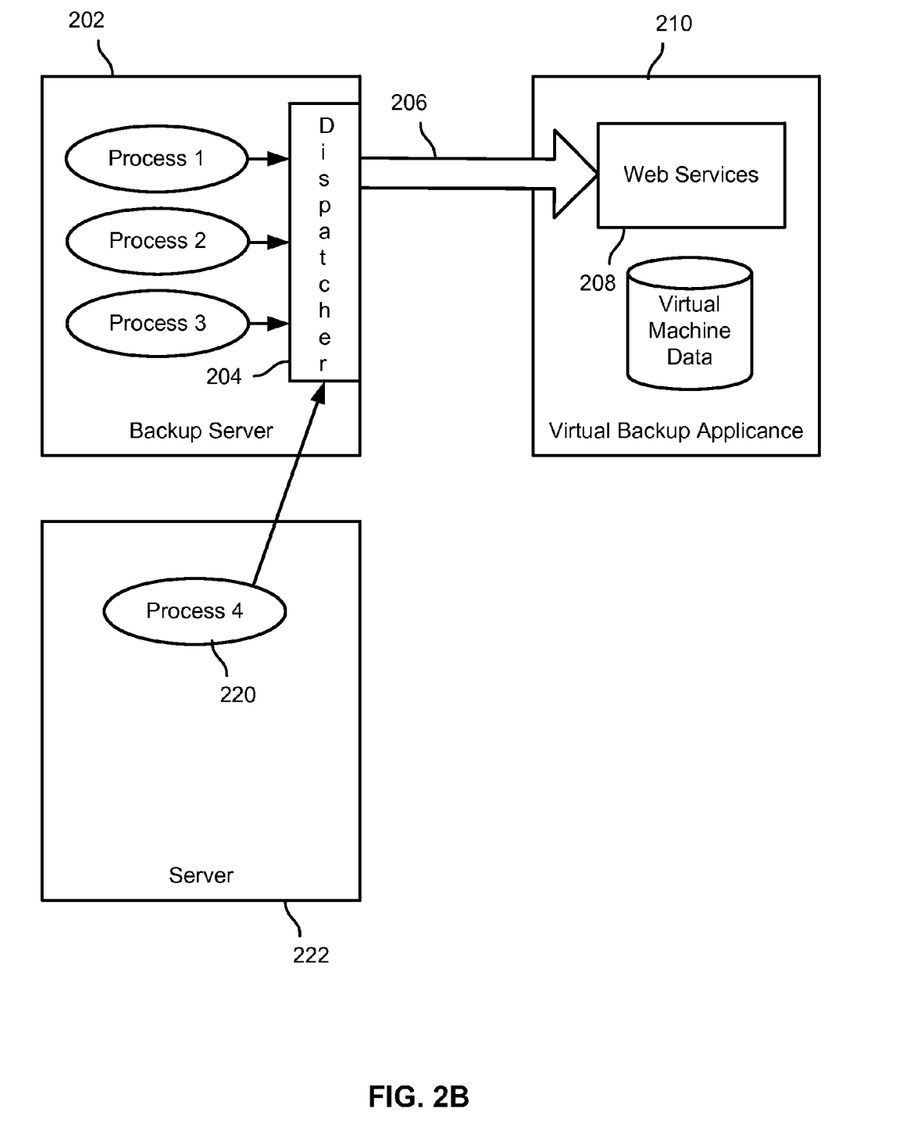
FIG. 2B is a block diagram illustrating an embodiment of a system comprising a dispatcher to manage calls to other applications and services.

FIG. 2B is a block diagram illustrating an embodiment of a system comprising a dispatcher to manage calls to other applications and services. In the example shown, a process 220 running on a second server 222 also uses the dispatcher 204 of server 202 to access a service 208 of virtual backup appliance 210. In various embodiments, the dispatcher 204 is configured to accept requests from at least configured and/or otherwise recognized external systems to access a service via the dispatcher 204. In various embodiments, access is provided in the same way as for calling processes running on a same system as the dispatcher 204.

Figure 2C:
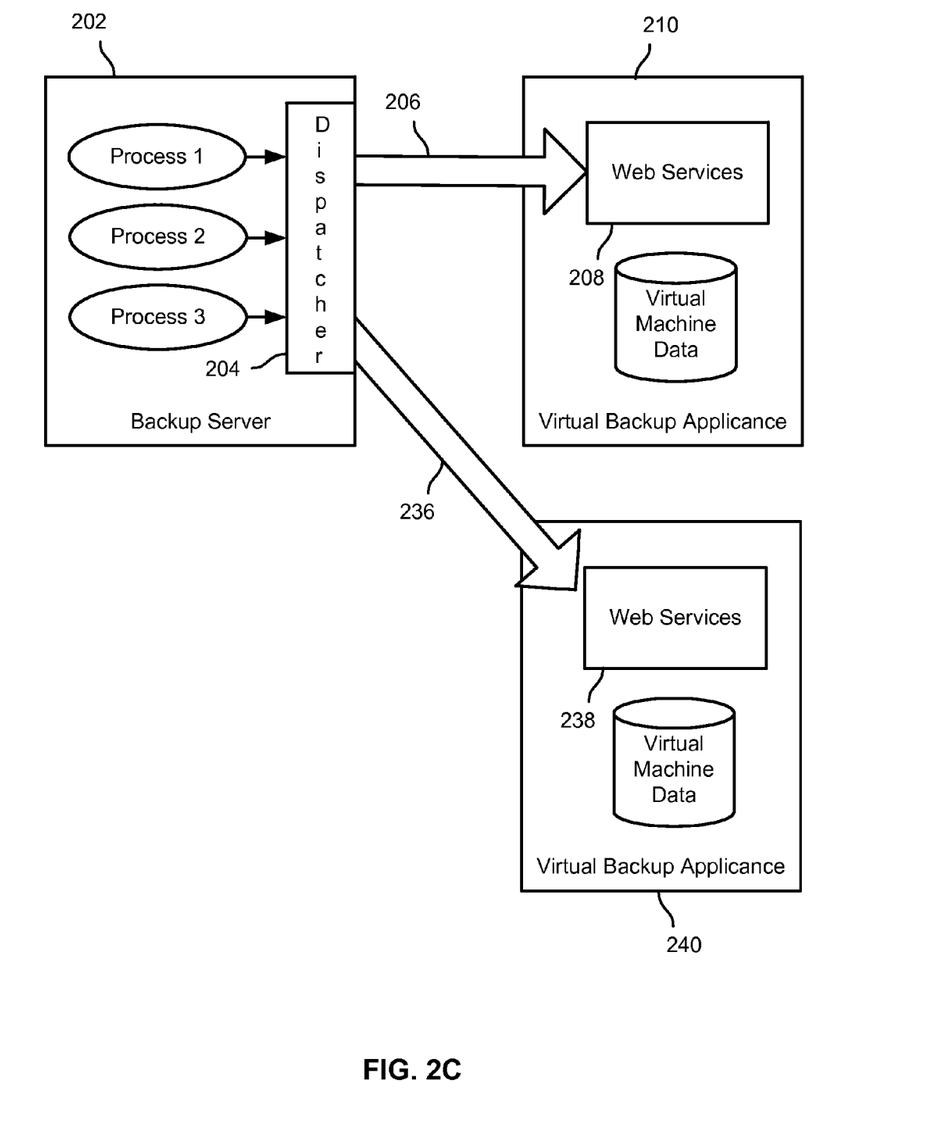
FIG. 2C is a block diagram illustrating an embodiment of a system comprising a dispatcher to manage calls to other applications and services.

FIG. 2C is a block diagram illustrating an embodiment of a system comprising a dispatcher to manage calls to other applications and services. In the example shown, the dispatcher 204 is configured to provide access to the service 208 of virtual backup appliance 210 and also to provide access, via a set of one or more connections 236, to a service 238 of a second virtual backup appliance 240. In various embodiments, a process of backup server 202 may need the same service to be provided with respect to data stored on a set of two or more different virtual backup appliances and/or other entities. In some embodiments, dispatcher 204 is configured to enable a calling process to indicate a service request/call and a set of one or more destination services, applications, systems, and/or other logical or physical entities with respect to which the same service is desired to be requested. The dispatcher 204 keeps track of which entities the service request has been sent to on behalf of the calling process. In some embodiments, the dispatcher 204 may collect results from the respective called services and/or service instances, and may package and return an aggregated set of results to the calling process.

Figure 3:
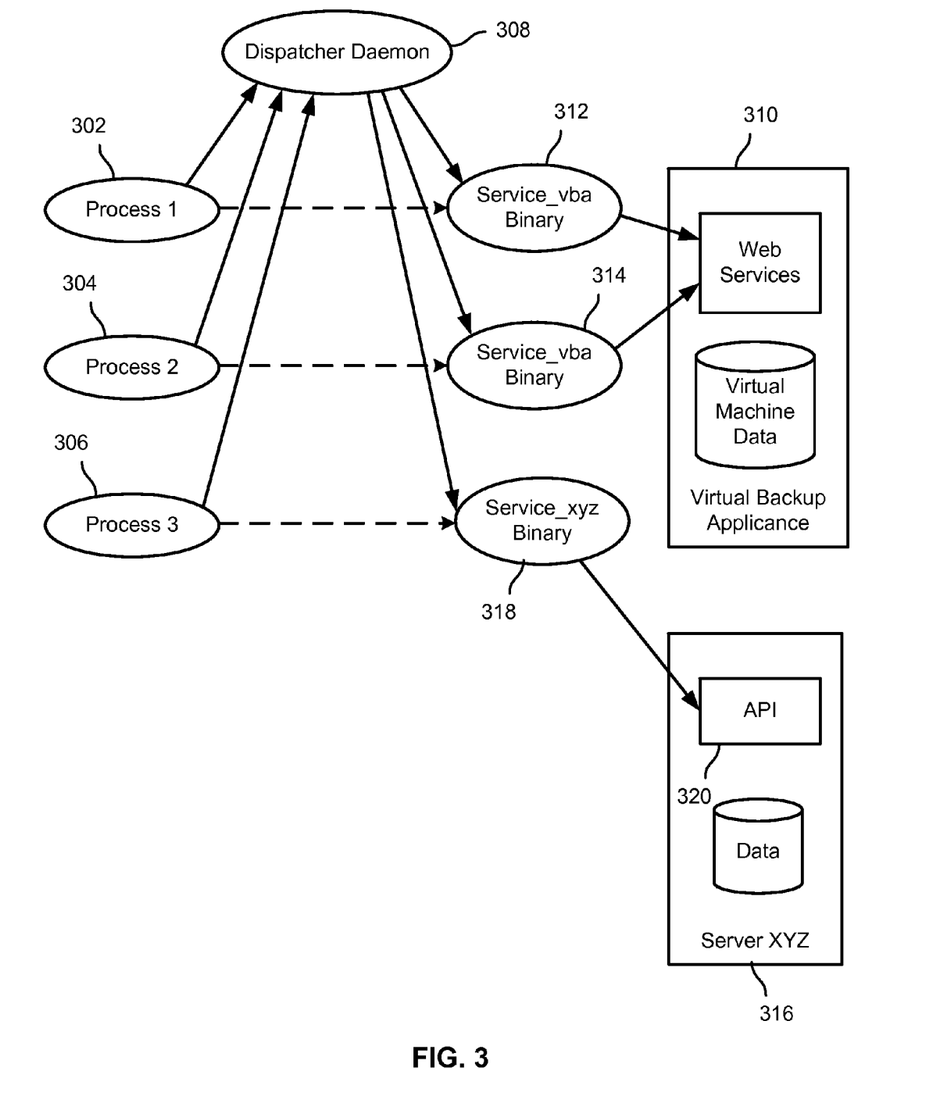
FIG. 3 is a block diagram illustrating an embodiment of a dispatcher daemon.

FIG. 3 is a block diagram illustrating an embodiment of a dispatcher daemon. In the example shown, a set of calling processes includes processes 302, 304, and 306, each of which calls a dispatcher daemon 308 to access external services. In the example shown, the processes 302 and 304 have sent to the dispatcher daemon 308 requests to access a service "vba" of a virtual backup appliance 310. To provide such access, the dispatcher daemon 308 has spawned a service-specific and calling process-specific service binary instance 312 to provide process 302 with access to the service "vba" of virtual backup appliance 310, and a service-specific and calling process-specific service binary instance 314 to provide process 304 with access to the service "vba" of virtual backup appliance 310. The dashed arrows connecting process 302 to "service_vba" binary instance 312 and process 304 to "service_vba" binary instance 314 indicate in this example that the dispatcher daemon 308 has spawned and initialized these respective service binary instance each for the corresponding calling process with which it is specifically associated, and the dispatcher daemon 308 has caused each service binary to be connected to the associated service and configured itself to proxy to the respective service binary instances service requests received from the calling processes 302, 304. In addition, in the example shown in FIG. 3, a third calling process 306 has requested access via the dispatcher daemon 308 to a service "xyz" of a server 316. In response, the dispatcher daemon 308 has spawned a service-specific and calling process-specific service binary instance 318 to provide access to the service "xyz" via an API or other service-oriented interface 320 of the server 316.

The approach illustrated in FIG. 3, for example, is robust and scales well. For example, if an external service and/or associated tool crashes, only access to that service is affected. Likewise, a problem with a service request to a service from a specific calling process may affect access to that service only by that same calling process, and since the calling process is not blocked and does not participate directly in the interaction with the external service, the calling process and/or other processes of the calling server may be able to continue to function without crashing in the event such a failure. If access is required to new and/or additional services and/or instances thereof, and/or if new and/or additional calling processes require such access, the dispatcher daemon 308 need only instantiate and initialize additional service binary instances, as required.

Figure 4:
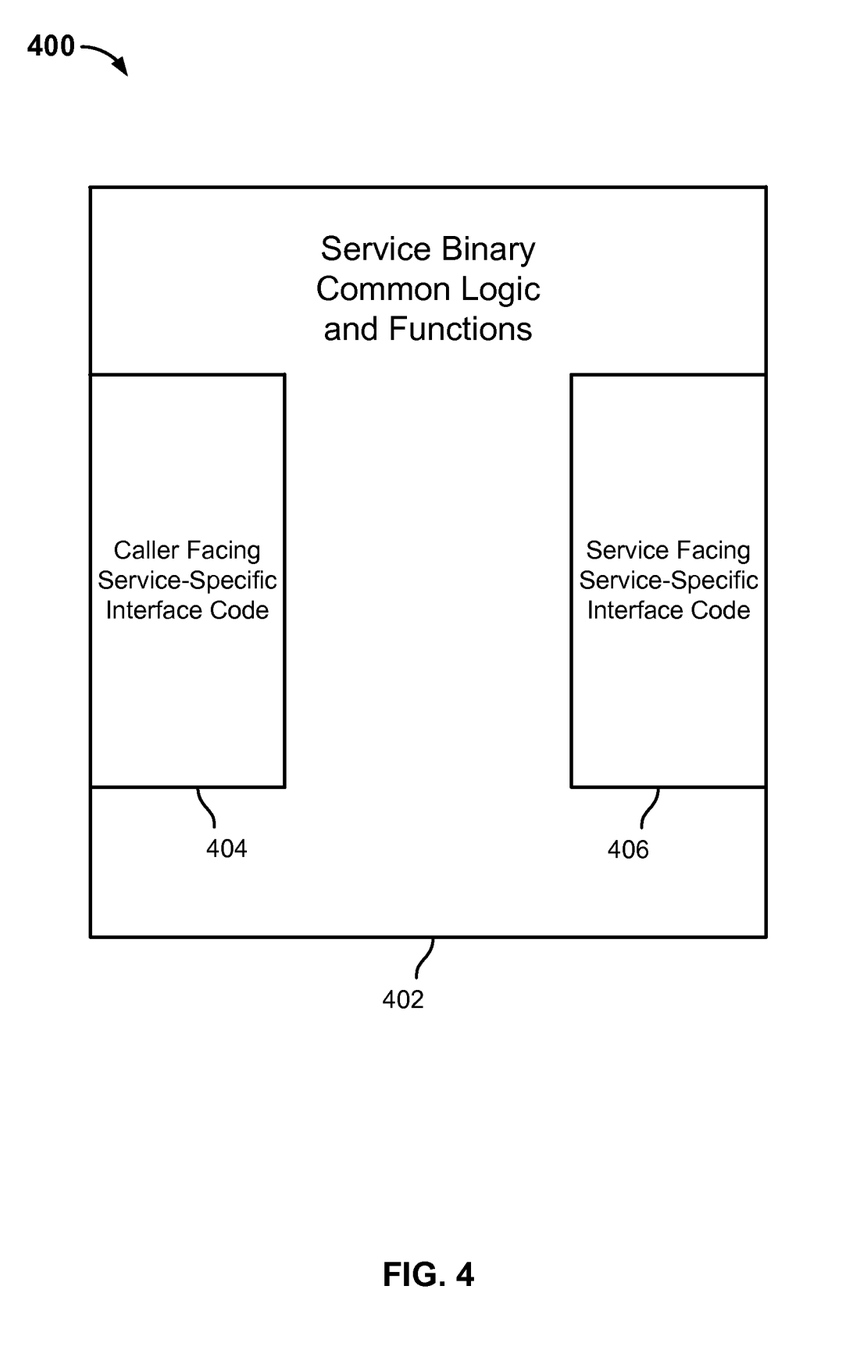
FIG. 4 is a block diagram illustrating an embodiment of a service binary.

FIG. 4 is a block diagram illustrating an embodiment of a service binary. In the example shown, a service binary 400 includes a service binary common logic and functions 402; a calling process-facing service-specific interface code 404, configured to receive from a calling process one or more service requests associated with the service; and a service-facing service-specific interface code 406, configured to call the service on behalf of a calling process, for example in a manner required by an API or other interface of the service. In various embodiments, the service binary common logic and functions 402 includes computer code operable to assign to each received service request a unique transaction identifier; to receive and store service request-related variables, such as arguments to be provided to the external service to make the request; logic to enforce rules, policies, and/or configurations, such as how long to wait for a response until a "timeout" or similar event is generated; and how to make results available to a calling process, e.g., by calling a function associated with returning results to the calling process, waiting for a "poll" or other communication from the calling process, etc. In some embodiments, the service binary 400 may be created in part by adding to a template or other copy of code comprising the service binary common logic and functions 402 the portions specific to the service for which the binary is being created, e.g., the interface code portions 404, 406 in the example shown in FIG. 4.

Figure 5:
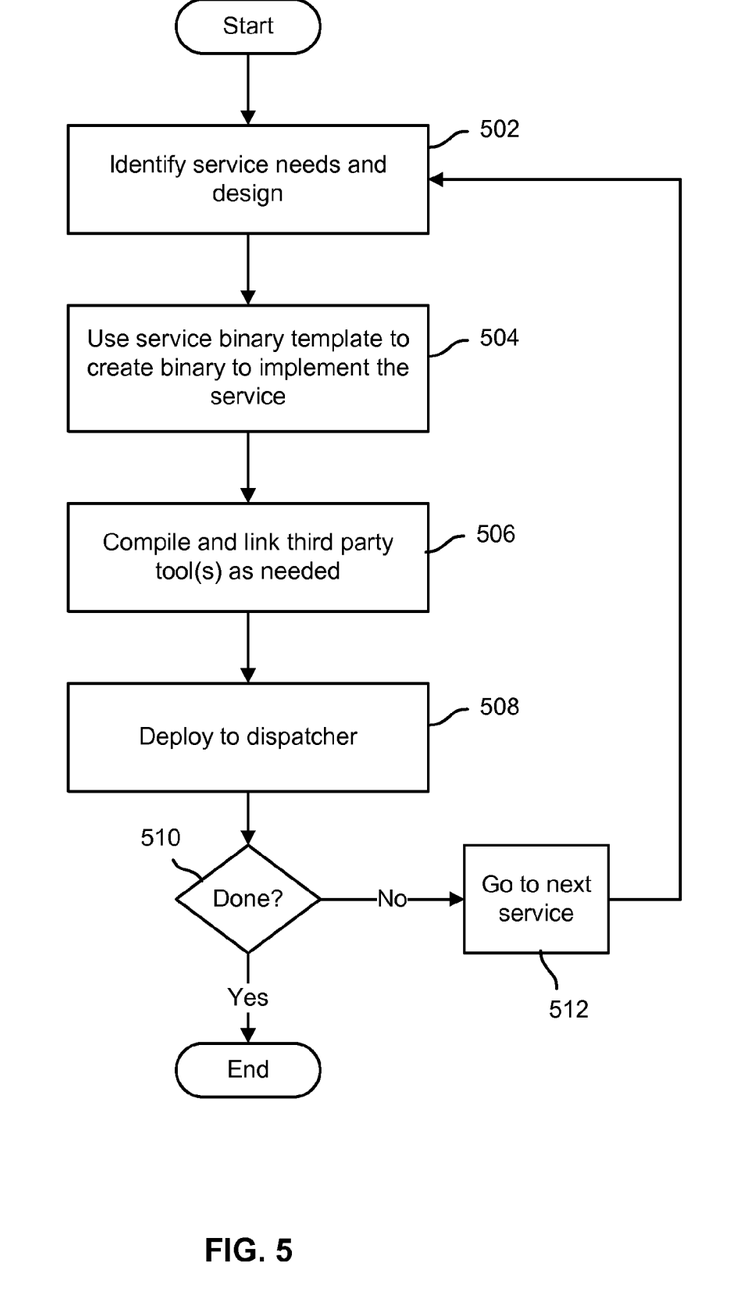
FIG. 5 is a flow chart illustrating an embodiment of a process to create a service binary.

FIG. 5 is a flow chart illustrating an embodiment of a process to create a service binary. In the example shown, the service-related needs and associated aspects of the service design, such as aspects of the service the calling processes may need to access, arguments form and content of service requests, etc., are identified (502). A service binary template is used to create binary to provide access to the service (504), for example by plugging into and/or otherwise integrating into the template any required service-specific code, such as code to implement and/or interact with the interfaces of the service. The resulting code is compiled and linked as needed to any third part tools comprising and/or required to be used to access the service (506). The compiled binary is deployed (508). In some embodiments, deployment includes registering the binary with a dispatcher daemon or other dispatcher. If no other service binaries are to be created (510), the process ends. Otherwise, steps 502, 504, 506, and 508 are repeated for a next service for which a binary is to be created (512).

Figure 6:
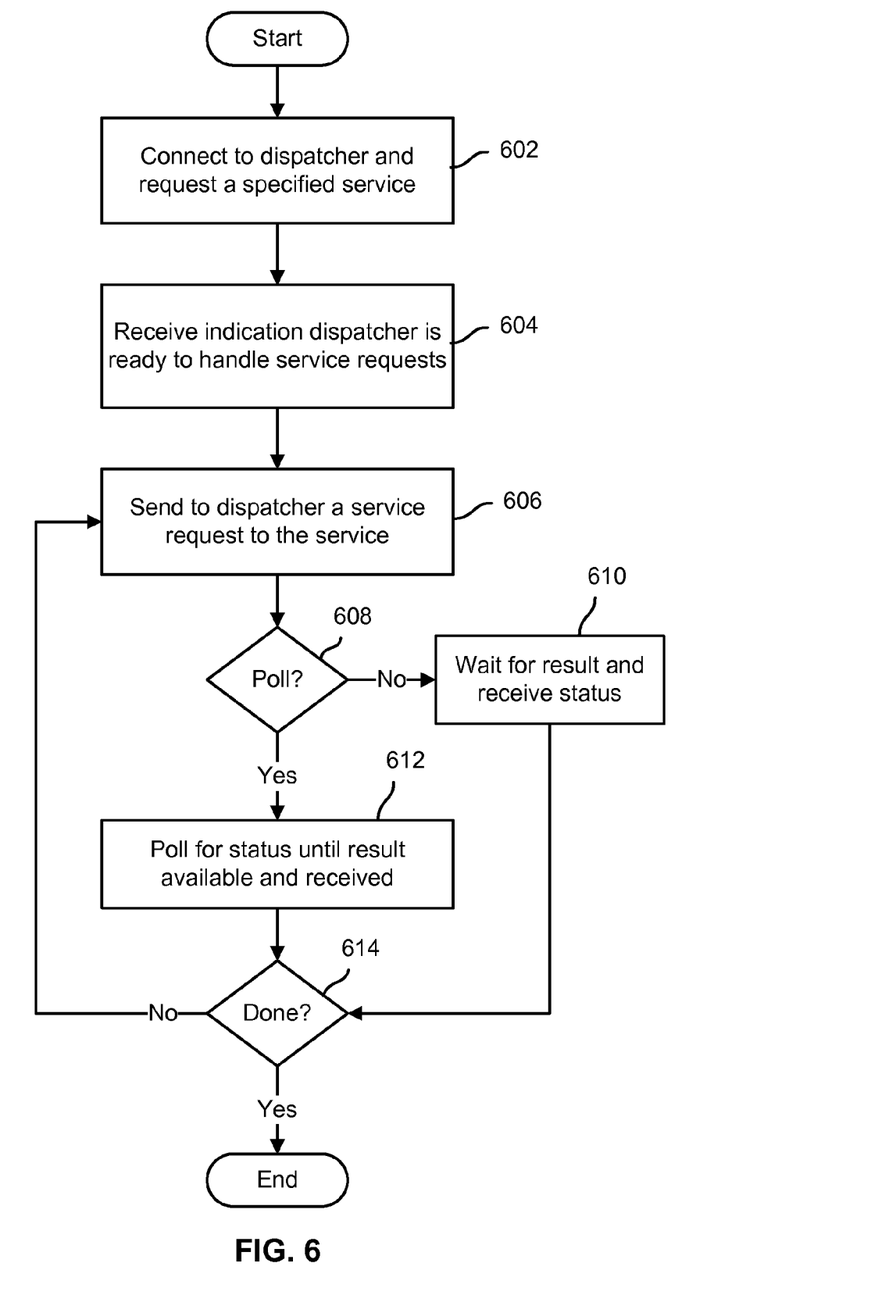
FIG. 6 is a flow chart illustrating an embodiment of a process to access a service.

FIG. 6 is a flow chart illustrating an embodiment of a process to access a service. In various embodiments, a server or other calling process may be configured to access an external service, for example one comprising and/or otherwise associated with another application, at least in part by implementing the process of FIG. 6. In the example shown, the calling process connects to a dispatcher, such as the dispatcher daemon 308 of FIG. 3, and requests access to a specified service (602). An indication is received from the dispatcher that the dispatcher is ready to handle service requests from the calling party to the service (604). A service request to the service is sent by the calling process to the dispatcher (606), after which the calling process may move on to perform other tasks. If the service and/or request is one with respect to which the calling process must poll the dispatcher, e.g., periodically, to check for results and/or status information (608), then as/when required the calling process polls the dispatcher for status and/or results until status/results are available (612). If instead the service and/or request are of a type that the dispatcher is configured to return status/results by calling a function of and/or associated with the calling process (608), the calling process waits for results and/or status information be to be received (610) from the dispatcher. Subsequent iterations of the process of FIG. 6 may be performed unless/until all required service requests have been processed (614).

Figure 7:
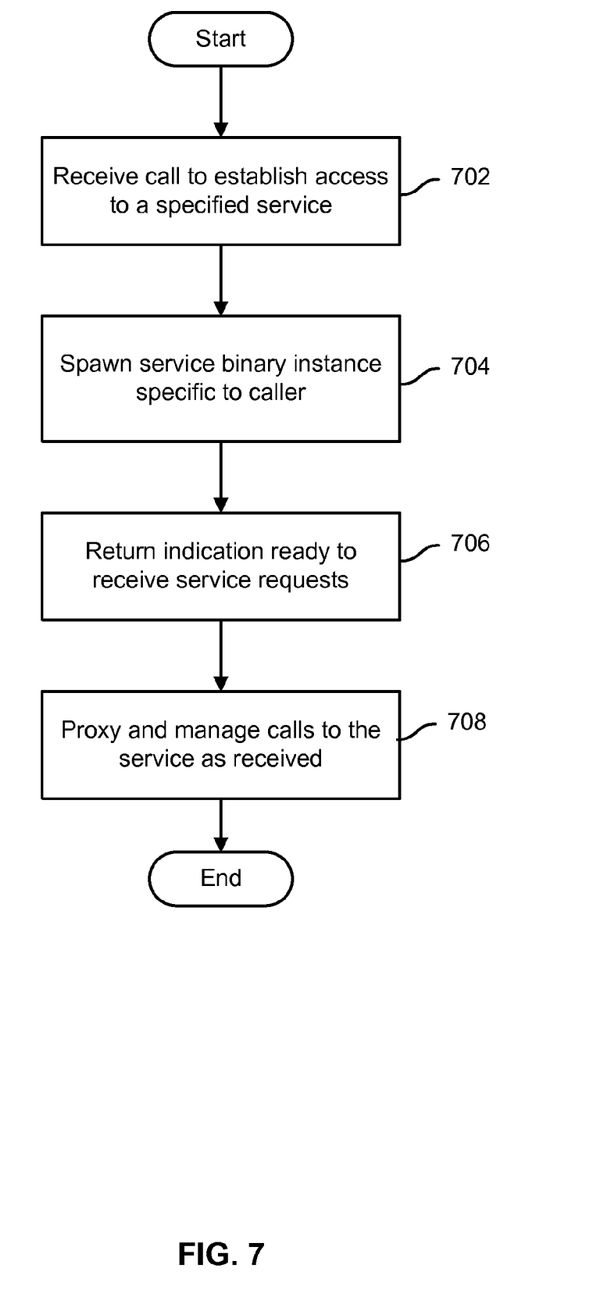
FIG. 7 is a flow chart illustrating an embodiment of a process to provide access to a service.

FIG. 7 is a flow chart illustrating an embodiment of a process to provide access to a service. In various embodiments, a dispatcher daemon or other entity may implement the process of FIG. 7, for example to respond to requests to establish access to a new service and/or from a new calling process. In the example shown, a request to establish access to a specified service is received (702). In some embodiments, the request to establish access may comprise a first service request to the service. A service binary instance specific to the calling process is spawned (704). Once the service binary instance has been created and initialized, an indication is returned to the calling process that service requests are ready to be received from the calling process (706). Subsequently, the dispatcher or other entity acts as a proxy to the service binary instance, processing and managing service requests as received from the calling process (708).

Figure 8:
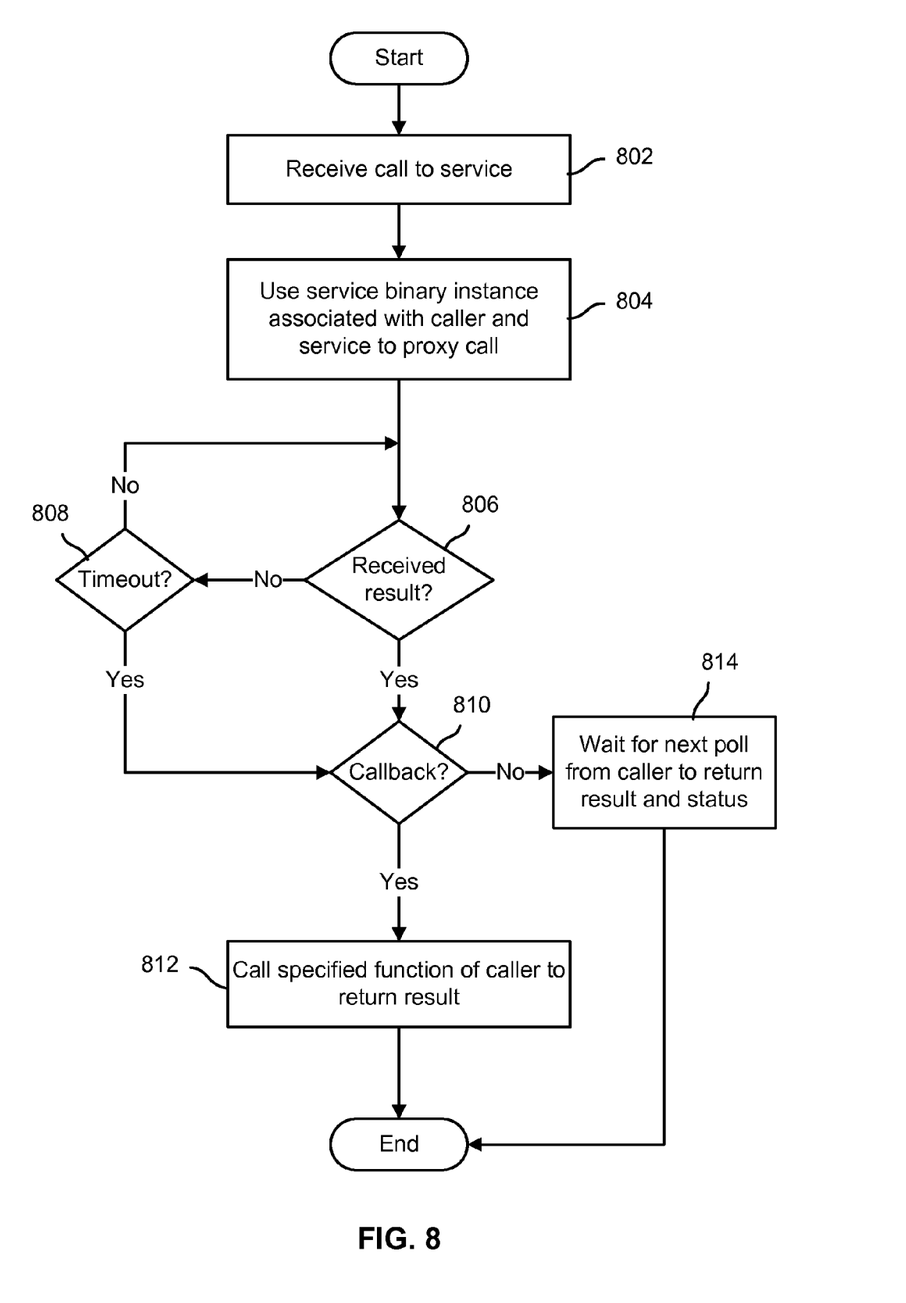
FIG. 8 is a flow chart illustrating an embodiment of a process to fulfill a service request.

FIG. 8 is a flow chart illustrating an embodiment of a process to fulfill a service request. In various embodiments, step 708 of FIG. 7 may be performed at least in part by implementing the process of FIG. 8. In the example shown, a service request, such as a call to a service, is received, for example at a dispatcher or other entity (802). A service binary instance, e.g., one specific to the calling process and/or to the called service, is used to invoke the service, on behalf of the calling process, to fulfill the request (804). Once a result is received (806) or the request times out (808), whichever occurs first, if the result/status is to be returned by calling a function comprising and/or associated with the calling process that invoked the service (810), a call to that function is made to return the result/status (812). Otherwise, the dispatcher or other entity implementing the process of FIG. 8 waits until a next polling or other communication from the calling process, and in response the service request result and/or status is provided (814).

Using techniques disclosed herein, a dispatcher or other entity can provide a non-blocking API to a service consumer, to enable the application other service consumer to continue execution even though it needs to make a blocking API call provided by another application. In various embodiments, if the API or other interface provided by a third party crashes, then the application or other service consumer doesn't crash, because the fault will be isolated in the dispatcher service process.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving from a calling process a call to a service;
generating a proxy instance for the call to the service;
calling, using the proxy instance, the service on behalf of the calling process in a manner that does not require the calling process to remain blocked during at least a portion of a time during which the call to the service is performed;
starting a timer in response to receiving the call from the calling process; and
in response to the proxy instance receiving a result for the call or the timer having expired, returning, by the proxy instance, at least one of the result or a status of the call to the calling process.

2. The method of claim 1, further comprising receiving, by the proxy instance, a response to the call from the service.

3. The method of claim 2, further comprising returning, by the proxy instance, the response is to the calling process.

4. The method of claim 3, wherein the response is returned to the calling process in response to a poll or other communication from the calling process.

5. The method of claim 3, wherein the response is returned to the calling process at least in part by calling a function associated with the calling process.

6. The method of claim 5, wherein the function associated with the calling process was indicated by the calling process in the call.

7. The method of claim 1, wherein the receiving of the call to the service includes receiving one or more calls to one or more services, and
wherein the generating of the proxy instance includes generating, for each of the one or more calls to the one or more services, a proxy instance that is specific to a corresponding one of the one or more calls to the one or more services.

8. The method of claim 1, wherein the generating of the proxy instance comprises spawning a dispatcher thread to handle the call.

9. The method of claim 1, wherein the generating of the proxy instance comprises spawning a service binary instance to handle the call.

10. The method of claim 9, wherein the service binary instance is specific to the service associated with the calling process.

11. The method of claim 9, wherein the service binary instance is specific to the service.

12. The method of claim 11, wherein the service comprises a first service, the service binary instance comprises an instance of a first service binary, and further comprising receiving from the calling process a second call to a second service; and invoking a second service binary instance, comprising an instance of a second service binary associated with the second service, to call the second service on behalf of the calling process in response to the second call.

13. The method of claim 9, wherein the service binary instance is specific to the calling process.

14. The method of claim 13, wherein the calling process is a first calling process, the call comprises a first call, and the service binary instance comprises a first service binary instance; and the method further includes receiving from a second calling process a second call to the service, and invoking a second service binary instance to call the service on behalf of the second calling process to satisfy the second call.

15. The method of claim 1, further comprising serving as a proxy between the calling process and the service binary instance.

16. The method of claim 1, wherein the calling process comprises a backup process.

17. The method of claim 1, wherein the service is associated with a data storage node.

18. The method of claim 17, wherein the calling process comprises a backup process configured to backup data stored on the storage node, at least in part by making the call to the service.

19. The method of claim 1, wherein the proxy instance resides in a first device and the calling process resides in a second device.

20. The method of claim 1, wherein the proxy instance manages a set of connections between a first device on which the proxy instance resides and a second device that is remote in relation to the first device and that provides the service.

21. The method of claim 1, further comprising:
in the event that the calling process sends the call to the service, performing, by the calling process, other work while the calling process awaits at least one of the result or the status of the call.

22. The method of claim 1, further comprising:
crashing, by the service, on a remote system; and
in the event the service crashed, performing, by the calling process, other work such that the calling process is not affected by the crashing of the service other than not receiving performance of the service in response to the call to the service.

23. A system, comprising:
a communication interface; and
a processor coupled to the communication interface and configured to:
receive from a calling process a call to a service;
generate a proxy instance for the call to the service;
call, using the proxy instance, the service on behalf of the calling process, via the communication interface, in a manner that does not require the calling process to remain blocked during at least a portion of a time during which the call to the service is performed;
start a timer in response to receiving the call from the calling process; and
in response to the proxy instance receiving a result for the call or the timer having expired, return at least one of the result or a status of the call to the calling process.

24. The system of claim 23, wherein the processor is further configured to receive from the service a response to the call and to return the response to the calling process at least in part by calling a function associated with the calling process.

25. The system of claim 23, wherein the processor is further configure to spawn a service binary instance to handle the call.

26. A computer program product, embodied in a tangible, non-transitory computer readable storage medium, comprising computer instructions for:
receiving from a calling process a call to a service;
generating a proxy instance for the call to the service;
calling, using the proxy instance, the service on behalf of the calling process in a manner that does not require the calling process to remain blocked during at least a portion of a time during which the call to the service is performed;
starting a timer in response to receiving the call from the calling process; and
in response to the proxy instance receiving a result for the call or the timer having expired, returning, by the proxy instance, at least one of the result or a status of the call to the calling process.

* * * * *